(12) United States Patent
Lauxtermann

(10) Patent No.: US 7,952,635 B2
(45) Date of Patent: *May 31, 2011

(54) LOW NOISE READOUT APPARATUS AND METHOD WITH SNAPSHOT SHUTTER AND CORRELATED DOUBLE SAMPLING

(75) Inventor: Stefan Clemens Lauxtermann, Camarillo, CA (US)

(73) Assignee: Teledyne Licensing, LLC, Thousand Oaks, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 11/960,415

(22) Filed: Dec. 19, 2007

(65) Prior Publication Data

US 2009/0160989 A1 Jun. 25, 2009

(51) Int. Cl.
 *H04N 3/14* (2006.01)
 *H04N 5/217* (2011.01)
 *H01L 27/00* (2006.01)
 *H01L 29/04* (2006.01)
 *H01L 31/102* (2006.01)

(52) U.S. Cl. ..... 348/308; 348/241; 348/294; 250/208.1; 257/59; 257/184

(58) Field of Classification Search ............... 348/308, 348/241, 294; 250/208.1, 214.1, 207, 214 R, 250/214; 257/59, 72, 258, 291, 443, 294, 257/435, 357, 184, 257

See application file for complete search history.

(56) References Cited

U.S. PATENT DOCUMENTS

| 7,030,918 B1 * | 4/2006 | Nakashiba ............... 348/294 |
| 7,045,754 B2 * | 5/2006 | Manabe et al. .......... 250/208.1 |
| 7,332,786 B2 * | 2/2008 | Altice et al. ............... 257/445 |
| 7,465,602 B2 * | 12/2008 | Altice et al. ............. 438/57 |
| 7,514,716 B2 * | 4/2009 | Panicacci ................. 257/72 |
| 7,538,307 B1 * | 5/2009 | Lauxtermann ........... 250/207 |
| 7,619,196 B2 * | 11/2009 | Oda ........................ 250/208.1 |
| 7,696,545 B2 * | 4/2010 | Panicacci ................. 257/292 |
| 7,829,834 B2 * | 11/2010 | Kim et al. ................ 250/208.1 |
| 2002/0020845 A1 * | 2/2002 | Ogura et al. ............. 257/88 |

OTHER PUBLICATIONS

S. Lauxtermann et al, "Comparison of global Shutter Pixels for CMOS Image Sensors", 2007 Proc. International Image Sensor workshop, Ogunquit, ME, Jun. 6-10, 2007, pp. 82-85.*

Y. Bai et al., "Teledyne Imaging Sensors: Silicon CMOS Imaging technologies for X-rays, UV, visible and infrared", 2008 SPIE Conference on Astronomical Instrumentation Proceedings, Marseille, FR, 2008, SPIE vol. 7021, pp. 702102-1 to 702102-16 (2008).*

* cited by examiner

*Primary Examiner* — Lin Ye
*Assistant Examiner* — Marly Camargo
(74) *Attorney, Agent, or Firm* — Koppel, Patrick, Heybl & Philpott

(57) ABSTRACT

A low noise readout apparatus and method for CMOS image sensors having a photosensitive element configured to collect charge when light strikes the photosensitive element, a reset gate adjacent the photosensitive element and configured to drain excess charge from the photosensitive element, a first electrode, a second electrode and a third electrode, in series and adjacent the photosensitive element, the first electrode actuated to transfer a signal charge from the photosensitive element to the first electrode, the second electrode actuated to transfer the signal charge from the first electrode to the second electrode, the third electrode actuated to transfer the signal charge from the second electrode to the third electrode and onto a sense node, and a readout circuit coupled to the sense node, the readout circuit measures a voltage corresponding to the signal charge transferred to the sense node.

22 Claims, 5 Drawing Sheets

US 7,952,635 B2

LOW NOISE READOUT APPARATUS AND METHOD WITH SNAPSHOT SHUTTER AND CORRELATED DOUBLE SAMPLING

BACKGROUND

Field

This disclosure relates to the CMOS image sensors. More particularly, the invention relates to a low noise readout apparatus and method with snap shot shutter and correlated double sampling.

SUMMARY

A low noise readout apparatus for CMOS image sensors having a photosensitive element configured to collect charge when light strikes the photosensitive element, a reset gate adjacent the photosensitive element and configured to drain excess charge from the photosensitive element, a first electrode, a second electrode and a third electrode, in series and adjacent the photosensitive element, the first electrode actuated to transfer a signal charge from the photosensitive element to the first electrode, the second electrode actuated to transfer the signal charge from the first electrode to the second electrode, the third electrode actuated to transfer the signal charge from the second electrode to the third electrode and onto a sense node, and a readout circuit coupled to the sense node, the readout circuit measures a voltage corresponding to the signal charge transferred to the sense node. The first electrode may be actuated to transfer the signal charge from the photosensitive element to the first electrode during and/or after an integration period. The reset gate may be actuated to drain the excess charge from the photosensitive element after the second electrode is actuated.

In one embodiment, the low noise readout apparatus for CMOS image sensors includes a reset transistor and a supply voltage to provide drainage for the signal charge after the readout circuit measures the voltage corresponding to the signal charge transferred to the sense node. The low noise readout apparatus for CMOS image sensors may also include a deep p implant to shield the first electrode, the second electrode, the third electrode and the sense node from parasitic charge integration and/or a capacitive coupling shield for the second electrode and the sense node.

According to a feature of the present disclosure, a method for reducing noise readout in an image sensor is disclosed. The method includes collecting charge when light strikes the photosensitive element, transferring a signal charge to the first electrode during a first integration period, transferring the signal charge to the second electrode, draining an excess charge collected at the photosensitive element using the reset gate, initializing a sense node using a predetermined voltage potential from the readout circuit, sampling the predetermined voltage potential, transferring the signal charge to the third electrode, transferring the signal charge to the sense node to generate a corresponding readout voltage, sampling the corresponding readout voltage, and subsequently subtracting the predetermined voltage potential from the corresponding readout voltage to obtain a resultant readout voltage.

In one embodiment, the method further includes discontinuing the drainage of charge after the step of draining excess charge collected at the photosensitive element, initiating a second integration period prior to the step of transferring the signal charge to the sense node, and draining the excess charge after the step of transferring the signal charge to the second electrode.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the present invention will be described in reference to a preferred embodiment that provides a complementary metal oxide semiconductor ("CMOS") image sensor with increased sensitivity while providing snap shot shutter functionality. The present invention, however, is not limited to any particular imaging application nor is it limited by the examples described herein. Therefore, the description of the embodiments that follow are for purposes of illustration and not limitation.

Photodiodes and photogates are photosensitive elements used in digital imaging devices for converting optical signals into electrical signals. For example, a pinned photodiode may be used to produce and integrate photoelectric charges generated in CMOS image sensors. The photosensitive elements may be arranged in linear or two-dimensional arrays with a plurality of photosensitive sensors, generally designed as pixels, on a semiconductor chip. Each pixel generates an output signal representing the amount of light incident on the pixel.

Figure 1:
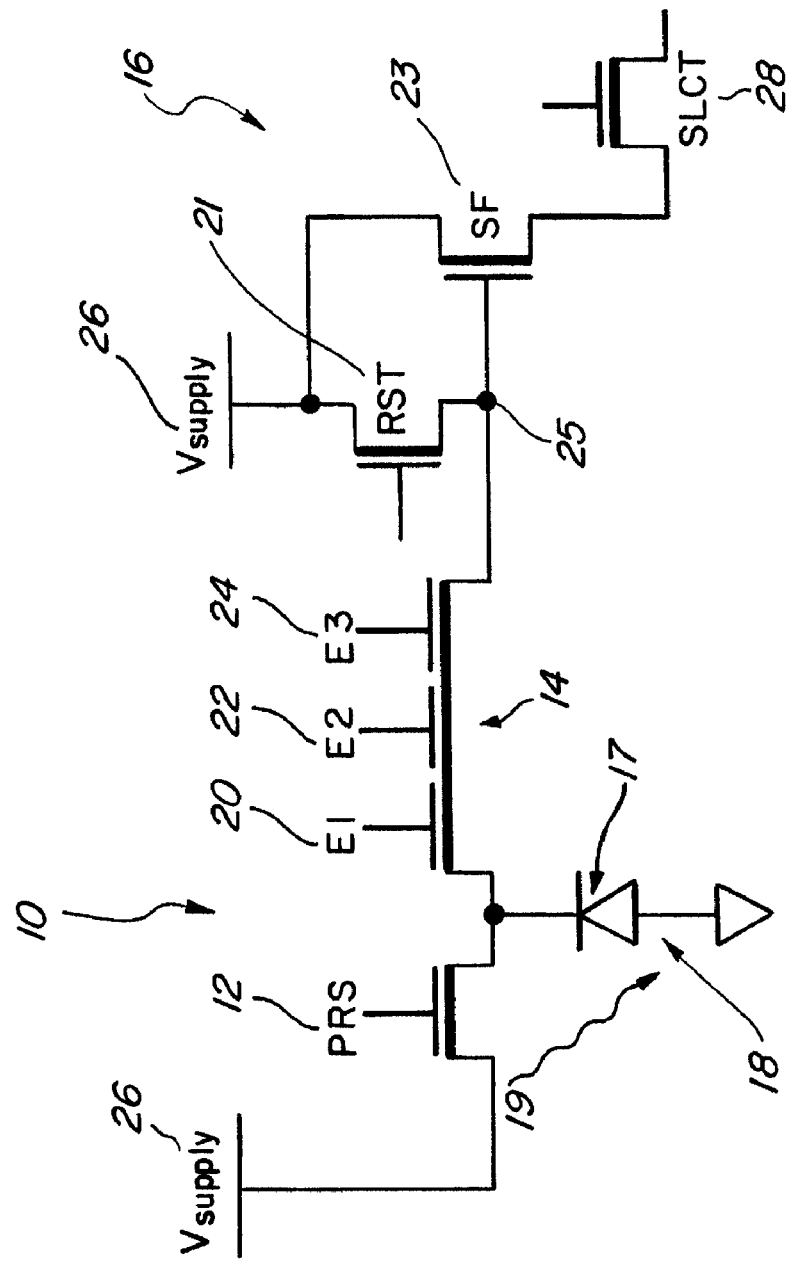
FIG. 1 is a low noise readout apparatus for a complementary metal oxide semiconductor with increased sensitivity while providing snap shot shutter functionality, according to an embodiment of the invention.

FIG. 1 is a low noise readout apparatus 10 for a complementary metal oxide semiconductor with increased sensitivity while providing snap shot shutter functionality, according to an embodiment of the invention. The complementary metal oxide semiconductor may include a plurality of pixels, each pixel having a reset gate 12, a charge-transporting circuit 14, a readout circuit 16 and a photosensitive element 18. The snapshot shutter functionality allows for capturing light simultaneously by the plurality of pixels.

The photosensitive element 18 may be configured to collect charge when light 19 strikes the photosensitive element 18. In one embodiment, the photosensitive element 18 may be configured to collect charge during and/or after an integration period. The charge may be stored in a storage capacitor 17 associated with or coupled to the photosensitive element 18. The photosensitive element 18 may be a photodiode, an avalanche photodiode, a pinned photodiode or a photo gate. The photosensitive element 18 may be coupled to the readout circuit 16 via the charge-transporting circuit 14 and sense node 25. Signal charge may be transferred to the charge-transporting circuit 14, while excess charge may be drained by reset gate 12.

The charge-transporting circuit 14 may include a plurality of gates or electrodes to transport charge across the low noise readout apparatus 10. In one embodiment, the charge-transporting circuit 14 includes a plurality of CCD electrodes. The charge transporting circuit 14 may include a first electrode 20, a second electrode 22 and a third electrode 24. The electrodes 20, 22 and 24 may be aligned in series and adjacent the photosensitive element 18. The first electrode 20 may be actuated to transfer the signal charge from the photosensitive element 18 to the first electrode 20. In one embodiment, the first electrode 20 may be actuated to transfer the signal charge from the photosensitive element 18 to the first electrode 20 during an integration period. The second electrode 20 may be actuated to transfer the signal charge from the first electrode 20 to the second electrode 22. The third electrode 24 may be actuated to transfer the signal charge from the second electrode 22 to the third electrode 24 and onto the sense node 25. Typically, such a charge-transporting circuit 14 may be referred to as Charge Coupled Device, abbreviated CCD. The charge-transporting circuit 14 may be, but is not limited to, a surface channel or a buried channel CCD with no implants in between electrodes. It may be fabricated using abutting or overlapping poly-silicon electrodes. In one embodiment of the present invention, it may also be a transistor chain.

The reset gate 12 is adjacent the photosensitive element 18 and configured to drain excess charge from the photosensitive element 18. In one embodiment, the reset gate 12 may be actuated to drain the excess charge from the photosensitive element 18 after the second electrode 22 is actuated.

The readout circuit 16 may be configured to measure a voltage corresponding to the signal charge transferred to the sense node 25. In one embodiment, the readout circuit 16 may include a reset transistor 21, a supply voltage 26 and a source follower transistor 23. The reset transistor 21 initializes the sense node 25 using the supply voltage 26. The reset transistor 21 and the supply voltage 26 also provide drainage for the signal charge after readout. The supply voltage 26 may, for example, be 3.3V or less. After initialization, signal charge is transferred from charge-transporting circuit 14 to the sense node 25, where it causes a potential change at the node 25 with a corresponding readout voltage. The difference between the initialization voltage 26 and the corresponding readout voltage at sense node 25 provides a resultant readout voltage that is outputted to an output circuit via source follower transistor 23. In one embodiment, the readout circuit 16 also includes a select gate 28 for selecting a group of pixels to readout the signal charge.

Figure 2:
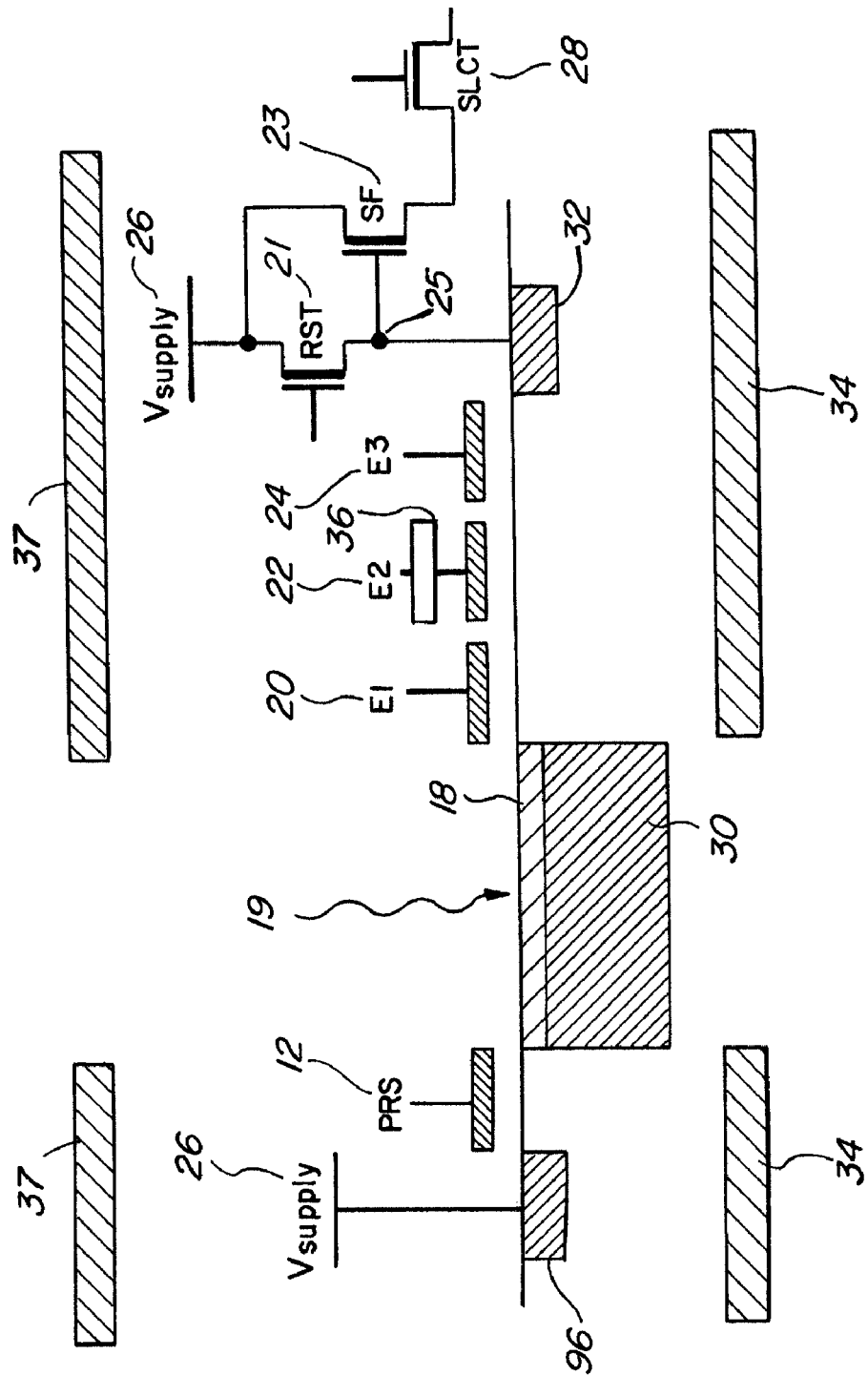
FIG. 2 is a cross-sectional view of the low noise readout apparatus of FIG. 1, according to an embodiment of the invention.

FIG. 2 is a cross-sectional view of the low noise readout apparatus 10, according to an embodiment of the invention. As illustrated, light 19 strikes the photosensitive element 18, transferring charge to a potential well 30 underneath the photosensitive element 18. The depth of this potential well 30 may be defined by the amount of charge collected by the photosensitive element 18. Signal charge is then transferred to the charge-transporting circuit 14. In one embodiment, the charge-transporting circuit 14 has no diffusion implants between the three electrodes 20, 22, and 24. Underneath each electrode 20, 22 and 24 is a potential well (not shown) that develops upon actuation of the respective electrode to transfer charge from potential well 30 across to the sense node 25. A potential well 32 for sense node 25 develops due to initialization of the sense node 25 with a predetermined reset voltage potential $V_{RS}$. The depth of the potential well 32 changes with transfer of signal charge from the photosensitive element 18 to the sense node 25.

In one embodiment, the low noise readout apparatus 10 may include a deep p implant 34 to shield the first electrode 20, the second electrode 22, the third electrode 24 and the sense node 25 from parasitic charge integration. The low noise readout apparatus 10 may also include a capacitive coupling shield 36 for the second electrode 22. The coupling shield 36 may be a metal shield that covers at least the second electrode 22. In another embodiment the low noise readout apparatus 10 may further include an optical light shield 37. The optical light shield 37 may be a metal shield that covers the entire readout apparatus except the photosensitive element 18.

Figure 3:
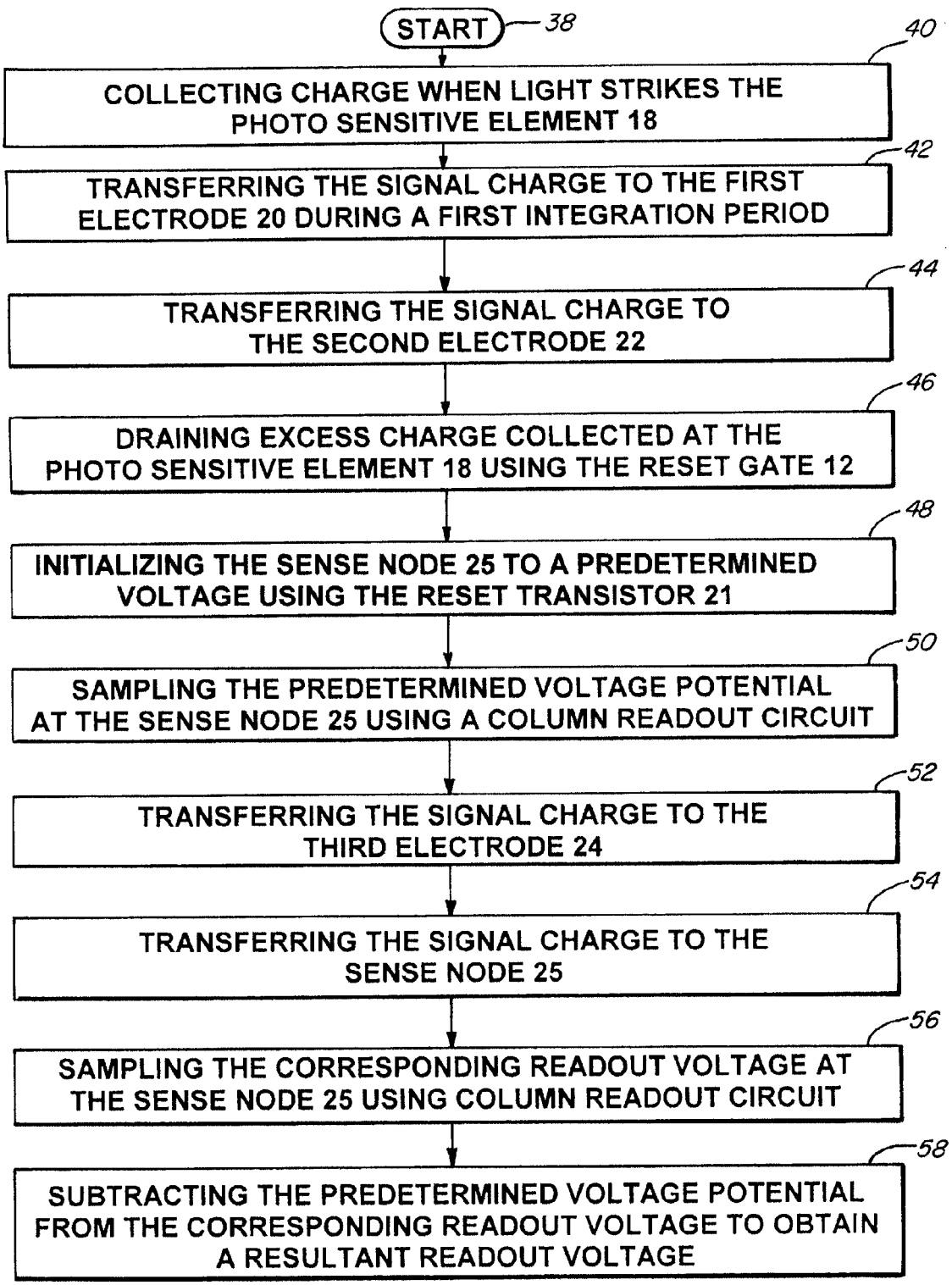
FIG. 3 is an exemplary flow chart outlining the operation of the low noise readout apparatus of FIG. 1, according to one embodiment of the present invention.
Figure 4:
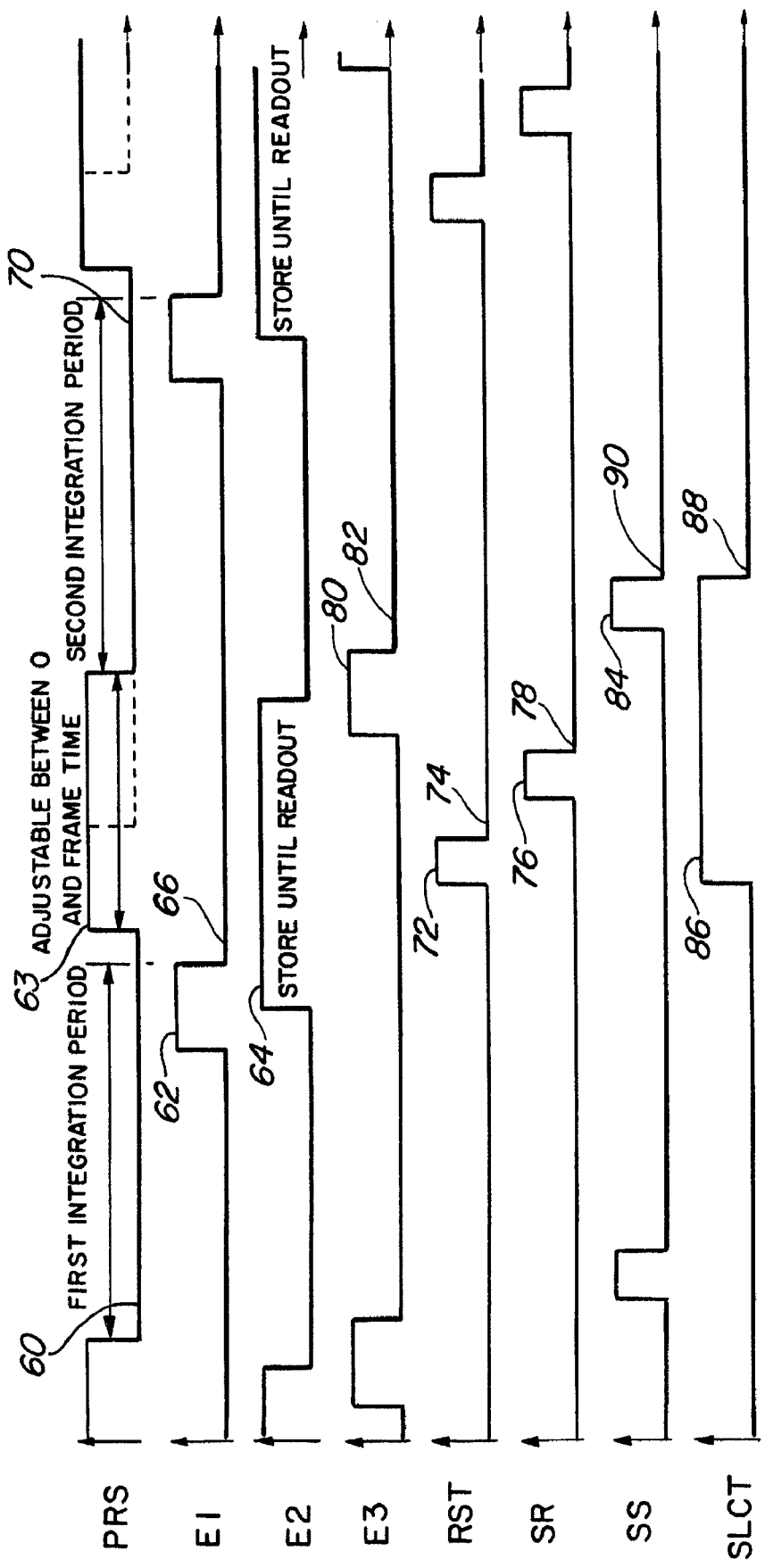
FIG. 4 is a timing diagram of the logic levels for the low noise readout apparatus of FIG. 1, according to an embodiment of the invention.

FIG. 3 is an exemplary flow chart outlining the operation of the low noise readout apparatus of FIG. 1, according to one embodiment of the present invention. FIG. 4 is a timing diagram of the logic levels for the low noise readout apparatus 10 of FIG. 1, according to an embodiment of the invention. The method begins (38) by collecting charge when light strikes the photosensitive element 18 (40). During this first integration period, the reset gate 12 may be clocked low 60, as shown in FIG. 4. After a predetermined period has lapsed, but during the first integration period, the first electrode 20 may be clocked high 62 to create a potential well underneath the first electrode 20. This potential well allows the signal charge to transfer to the first electrode 20 (42). In one embodiment, the first electrode 20 may be clocked high towards the end of the first integration period.

Next, the signal charge may be transferred to the second electrode 22 by clocking high 64 the second electrode 22 during the period where the first electrode 20 was clocked high 62 (44). For example, the second electrode 22 may be clocked high 64 in or about the middle of the high pulse for the first electrode 20. By clocking high 64 the second electrode 22, a potential well (not shown) is formed underneath the second electrode 22, allowing the transfer of signal charge to the second electrode 22. The signal charge is stored until readout at the second electrode 22. The potential well underneath the first electrode 20 is then collapsed by clocking low 66 the first electrode 20, as shown in FIG. 4.

After the first electrode 20 is clocked low 66 and the potential well underneath the first electrode 20 collapses, the first integration period ends. The reset gate 12 is then clocked high 68 to drain excess charge collected at the photosensitive element (46). The reset gate 12 is clocked high 68 until the start of the second integration period. As shown in FIG. 4, the second integration period begins when the reset gate 12 is clocked back to low 70. This prevents/discontinues the drainage of excess charge collected at the photosensitive element 18. In one embodiment, the second integration period begins prior to the transfer of signal charge to the sense node 25. The period where the reset gate 12 is clocked high 68 may be adjustable, as shown by the dotted line in FIG. 4, and depends on the moment in time where the second integration period is desired and/or on the desired length of integration time and/or when the signal charge stored underneath second electrode 22 is transferred to the sense node 25 for readout. In one embodiment, the reset gate 12 is clocked high 68 to drain excess charge after the signal charge is transferred to the second electrode 22.

At some point after the reset gate 12 is clocked high 68, a reset pointer (not shown) may be used to reset the sense node 25. The reset pointer actuates the reset transistor 21 to reset the sense node 25 by applying a predetermined voltage potential. This initializes the sense node 25 (48). As shown in FIG.

4, the reset transistor 21 is clocked high 72 to reset the sense node 25. According to one embodiment of the invention, the reset transistor 21 is clocked high 72 during the period where the second electrode 22 is clocked high 64 to store the signal charge. Since the signal charge underneath the second electrode 22 is isolated from the sense node 25, the applied voltage potential resets the sense node 25 without affecting the signal charge.

Once the sense node 25 is reset, the reset transistor 21 is clocked low 74. As shown in FIG. 4, a sample reset (SR) is clocked high 76 after the reset transistor 21 is clocked low 74. This allows the reset potential at the sense node 25 to be sampled using a column readout circuit (not shown), such as a column amplifier (50), thereby providing a reference voltage potential $V_{RS}$ for Correlated Double Sampling (CDS). The column readout circuit may be an analog processor configured to perform subtraction of two analog signals.

Next, the sample reset (SR) is clocked low 78 and the third electrode 24 is clocked high 80 to form a potential well underneath the third electrode 24. This potential well allows the signal charge to transfer to the third electrode 24 (52). The third electrode 24 is then clocked low 82 to collapse the potential well underneath the third electrode 24 and to transfer the signal charge to sense node 25 (54). As shown in FIG. 4, a sample signal (SS) is clocked high 84 after the third electrode 24 is clocked low 82. This allows a corresponding readout voltage $V_{RS}+V_S$ at the sense node 25 to be sampled using a column readout circuit (not shown) (56). The column readout circuit subtracts the predetermined voltage potential $V_{RS}$ from the corresponding readout voltage $V_{RS}+V_S$ to obtain a resultant signal readout voltage $V_S$ (58).

This correlated double sampling (CDS) method may be used to eliminate Fixed Pattern Noise (FPN), kTC noise and/or reduce 1/f noise contributions. If the signal charge is integrated over a long period of time, the low noise readout apparatus 10 may be configured to provide a reduction in noise bandwidth, thereby providing an improvement in signal to noise ratio. As can be envisioned by a person skilled in the art, other methods of correlated sampling, e.g. subtraction of the signals $V_{RS}$ and $V_{RS}+V_S$ in the digital domain, may be utilized to determine the resultant signal readout voltage $V_S$.

In one embodiment, the reset pointer actuates the select gate 28 to select a group of pixels to readout the signal charge. The select gate 28 is clocked high 86 before sample reset (SR) is clocked high 76 to turn on the pixel(s) prior to sampling the reset voltage potential $V_{RS}$. The select gate 28 is then clocked low 88 after the sample signal (SS) is clocked low 90 to turn off the pixel after sampling the signal charge.

Figure 5:
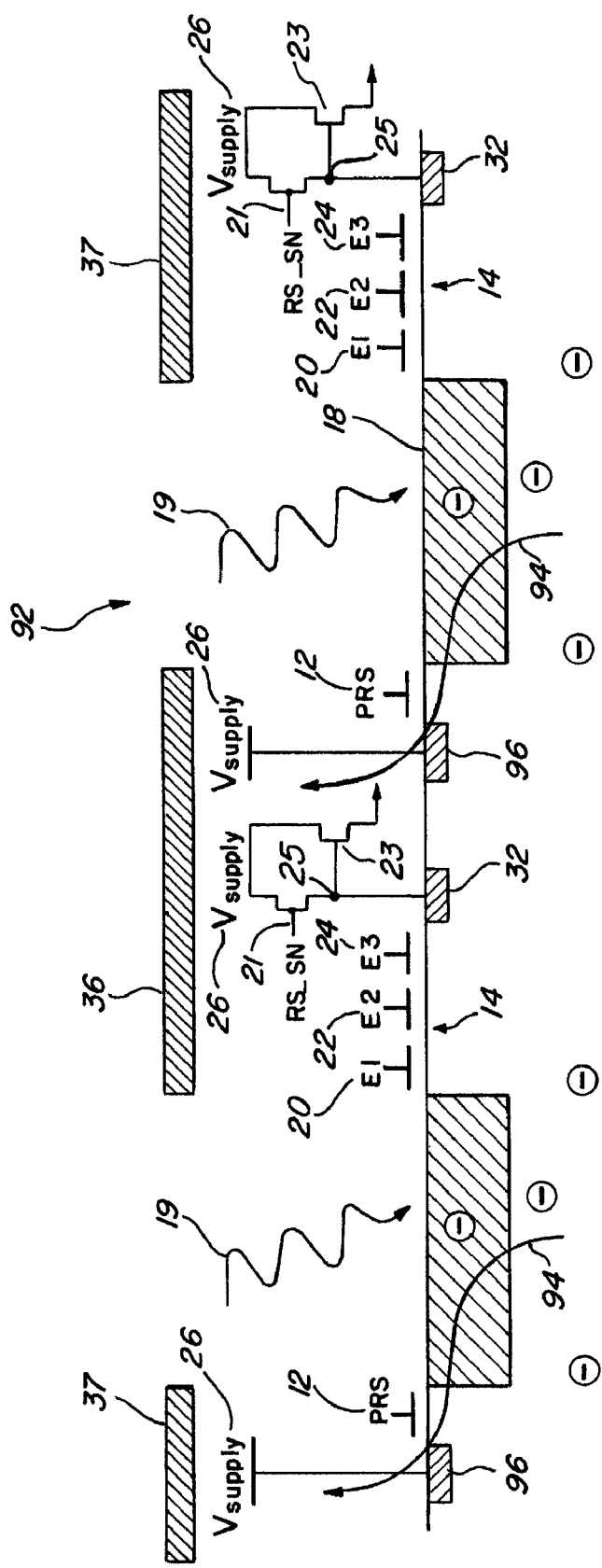
FIG. 5 is a cross-sectional view of a low noise readout apparatus illustrating excess charge drainage path, according to an embodiment of the invention.

FIG. 5 is a cross-sectional view of a low noise readout apparatus 92 illustrating excess charge drainage path 94, according to an embodiment of the invention. As illustrated, the photosensitive element 18 may have a relatively wide and deep implant to increase the probability of capturing charge when light strikes the photosensitive element 18. At the end of an integration period, the photosensitive element 18 may be coupled to a supply voltage 26 through implant 96 to provide an efficient controlled drainage path 94 for excess photogenerated charge carriers that otherwise would be captured on the second electrode 22 or the sense node 25. This parasitic charge integration of carriers that were generated outside the integration period interferes with signal charge readout and decreases the snapshot shutter performance. By operating the reset gate 12 adjacent the photosensitive element 18 in accordance with the present invention, the net effect for the snapshot shutter's extinction ratio is improved.

As is understood by a person skilled in the art, the present invention provides high sensitivity, low noise, snapshot shutter functionality without image artifacts introduced by other electronic line shutter implementations like rolling line shutters and complete kTC noise removal via CDS readout. As can be envisioned by a person skilled in the art, applications for the invention include, but are not limited to, electronic image capture for digital cameras. For example, image capture from cameras used for unmanned aerial vehicle (UAV) and other airborne platforms. Likewise, applications may also include automotive cameras, high speeds cameras, mobile phone cameras, single lens reflex (SLR) cameras, surveillance and machine vision.

While the low noise readout apparatus and method have been described in terms of what are presently considered to be the most practical and preferred embodiments, it is to be understood that the disclosure need not be limited to the disclosed embodiments. It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action. Similarly, each physical element disclosed should be understood to encompass a disclosure of the action which that physical element facilitates.

It should be understood that various modifications and similar arrangements are included within the spirit and scope of the claims, the scope of which should be accorded the broadest interpretation so as to encompass all such modifications and similar structures. The present disclosure includes any and all embodiments of the following claims.

The invention claimed is:

1. A CMOS image sensor, comprising:
   a photosensitive element configured to collect charge when light strikes the photosensitive element;
   a reset gate adjacent the photosensitive element and configured to drain excess charge from the photosensitive element;
   a charge-transporting circuit, comprising:
      a first charge coupled device (CCD) electrode, a second CCD electrode and a third CCD electrode, said CCD electrodes aligned in series and adjacent the photosensitive element, the first CCD electrode actuated to transfer a signal charge from the photosensitive element to the first CCD electrode, the second CCD electrode actuated to transfer the signal charge from the first CCD electrode to the second CCD electrode, the third CCD electrode actuated to transfer the signal charge from the second CCD electrode to the third CCD electrode and onto a sense node; and a readout circuit coupled to the sense node and arranged to measure a voltage corresponding to the signal charge transferred to the sense node.

2. The CMOS image sensor of claim 1, wherein the first CCD electrode is actuated to transfer the signal charge from the photosensitive element to the first CCD electrode during an integration period.

3. The CMOS image sensor of claim 1, wherein the reset gate is actuated to drain the excess charge from the photosensitive element after the second CCD electrode is actuated.

4. The CMOS image sensor of claim 1, wherein the photosensitive element is selected from a group consisting of a photodiode, an avalanche photodiode, a pinned photodiode and a photo gate.

5. The CMOS image sensor of claim 1, further comprising a reset transistor and a supply voltage to provide drainage for the signal charge after the readout circuit measures the voltage corresponding to the signal charge transferred to the sense node.

6. The CMOS image sensor of claim 1, further comprising a deep p implant to shield the first CCD electrode, the second CCD electrode, the third CCD electrode and the sense node from parasitic charge integration.

7. The CMOS image sensor of claim 1, wherein the photosensitive element is configured to collect charge after an integration period.

8. The CMOS image sensor of claim 1, further comprising a capacitive coupling shield for the second CCD electrode.

9. A method for reducing noise readout in an image sensor, the image sensor having a photosensitive element, a first charge coupled device (CCD) electrode, a second CCD electrode, a third CCD electrode, said first, second and third CCD electrodes aligned in series, a sense node, a reset gate and a readout circuit, the method comprising:
collecting charge when light strikes the photosensitive element;
transferring a signal charge to the first CCD electrode during a first integration period;
transferring the signal charge to the second CCD electrode;
draining an excess charge collected at the photosensitive element using the reset gate;
transferring the signal charge to the third CCD electrode; and
transferring the signal charge to the sense node to generate a corresponding readout voltage.

10. The method of claim 9, further comprising initializing the sense node using a predetermined voltage potential from the readout circuit prior to the step of transferring the signal charge to the sense node.

11. The method of claim 10, further comprising sampling the predetermined voltage potential, sampling the corresponding readout voltage, and subsequently subtracting the predetermined voltage potential from the corresponding readout voltage to obtain a resultant readout voltage.

12. The method of claim 9, further comprising discontinuing the drainage of charge after the step of draining excess charge collected at the photosensitive element.

13. A method for reducing noise readout in an image sensor, the image sensor having a photosensitive element, a first charge coupled device (CCD) electrode, a second CCD electrode, a third CCD electrode, said first, second and third CCD electrodes aligned in series, a sense node, a reset gate and a readout circuit, the method comprising:
collecting charge when light strikes the photosensitive element;
transferring a signal charge to the first CCD electrode during a first integration period;
transferring the signal charge to the second CCD electrode;
draining an excess charge collected at the photosensitive element using the reset gate;
transferring the signal charge to the third CCD electrode;
initiating a second integration period; and
transferring the signal charge to the sense node to generate a corresponding readout voltage.

14. The method of claim 9, further comprising draining the excess charge after the step of transferring the signal charge to the second CCD electrode.

15. The method of claim 9, wherein the photosensitive element is selected from a group consisting of a photodiode, an avalanche photodiode, a pinned photodiode and a photo gate.

16. The method of claim 9, further comprising shielding the second CCD electrode from capacitive coupling.

17. A low noise readout image sensor, comprising:
a photosensitive element configured to collect charge when light strikes the photosensitive element, said sensor arranged such that the photosensitive element collects charge during and after an integration period;
a reset gate adjacent the photosensitive element and configured to drain excess charge from the photosensitive element;
a charge-transporting circuit, comprising:
a first CCD electrode, a second CCD electrode and a third CCD electrode, said CCD electrodes aligned in series and adjacent the photosensitive element, the first CCD electrode actuated to transfer a signal charge from the photosensitive element to the first CCD electrode during the integration period, the second CCD electrode is actuated to transfer the signal charge from the first CCD electrode to the second CCD electrode, the third CCD electrode is actuated to transfer the signal charge from the second CCD electrode to the third CCD electrode and onto a sense node; and
a readout circuit coupled to the sense node and arranged to measure a voltage corresponding to the signal charge transferred to the sense node.

18. The low noise readout image sensor of claim 17, wherein the reset gate is actuated to drain the excess charge from the photosensitive element after the second CCD electrode is actuated.

19. The low noise readout image sensor of claim 17, wherein the photosensitive element is selected from a group consisting of a photodiode, an avalanche photodiode, a pinned photodiode and a photo gate.

20. The low noise readout image sensor of claim 17, further comprising a reset transistor and a supply voltage to provide drainage for the signal charge after the readout circuit measures the voltage corresponding to the signal charge transferred to the sense node.

21. The low noise readout image sensor of claim 17, further comprising a deep p implant to shield the first CCD electrode, the second CCD electrode and the third CCD electrode from parasitic charge integration.

22. The low noise readout image sensor of claim 17, further comprising a capacitive coupling shield for the second CCD electrode.

* * * * *